United States Patent
Lin et al.

(10) Patent No.: US 11,304,192 B2
(45) Date of Patent: Apr. 12, 2022

(54) OUTPUT POWER BASED ON COMMUNICATION BANDS

(71) Applicant: Hewlett-Packard Development Company, L.P., Spring, TX (US)

(72) Inventors: Cheng-Fang Lin, Taipei (TW); Huai-Yung Yen, Taipei (TW); Ren-Hao Chen, Taipei (TW); Lo-Chun Tung, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/977,846

(22) PCT Filed: Apr. 30, 2018

(86) PCT No.: PCT/US2018/030269
§ 371 (c)(1),
(2) Date: Sep. 3, 2020

(87) PCT Pub. No.: WO2019/212504
PCT Pub. Date: Nov. 7, 2019

(65) Prior Publication Data
US 2021/0058928 A1    Feb. 25, 2021

(51) Int. Cl.
*H04W 72/04* (2009.01)
*H04W 52/24* (2009.01)
*H04W 52/26* (2009.01)
*H04W 88/06* (2009.01)

(52) U.S. Cl.
CPC ..... *H04W 72/0453* (2013.01); *H04W 52/248* (2013.01); *H04W 52/267* (2013.01); *H04W 72/0473* (2013.01); *H04W 88/06* (2013.01)

(58) Field of Classification Search
CPC ............. H04W 52/248; H04W 52/267; H04W 72/0453; H04W 72/0473; H04W 88/06
USPC ........................................................ 370/329
See application file for complete search history.

(56) References Cited

U.S. PATENT DOCUMENTS

| | | | |
|---|---|---|---|
| 6,265,970 B1 * | 7/2001 | Whitehead ......... | G08B 13/1645 340/506 |
| 8,417,296 B2 | 4/2013 | Caballero et al. | |
| 8,909,282 B2 | 12/2014 | Ngai et al. | |
| 9,209,514 B2 | 12/2015 | Sivalingam | |
| 9,351,261 B2 | 5/2016 | Niskala | |
| 9,490,885 B1 | 11/2016 | Zheng et al. | |

(Continued)

FOREIGN PATENT DOCUMENTS

CN        102089989        6/2011

OTHER PUBLICATIONS

Mobile and Portable Devices RF Exposure . . . , Apr. 23, 2012, Federal Communications Commission, 30 pgs.

*Primary Examiner* — Gbemileke J Onamuti
(74) *Attorney, Agent, or Firm* — HPI Patent Department (57) ABSTRACT

An example electronic device includes a wireless transmitter and a controller. The controller is to: determine an active communication band; determine a parameter value of a proximity sensing circuit based on the active communication band; configure the proximity sensing circuit based on the parameter value; and set an output power of the wireless transmitter based on a detection signal asserted from the proximity sensing circuit. The wireless transmitter is to transmit data using the active communication band and the output power.

15 Claims, 6 Drawing Sheets

| Active Communication Band(s) | Sensitivity Setting | Output Power (full) | Output Power (reduced) |
|---|---|---|---|
| B1 | 0.9 CM | 31 dBm | 24 dBm |
| B2 | 1.5 CM | 35 dBm | 20 dBm |
| B1 and B2 | 1.5 CM | 35 dBm | 20 dBm |

(56) References Cited

U.S. PATENT DOCUMENTS

| | | |
|---|---|---|
| 9,531,420 B1 | 12/2016 | Prendergast et al. |
| 9,647,740 B1 | 5/2017 | Black et al. |
| 9,769,769 B2 | 9/2017 | Harper et al. |
| 9,867,139 B1 | 1/2018 | Khasgiwala et al. |
| 2006/0039453 A1* | 2/2006 | Yamada ............... H04B 1/7085 375/150 |
| 2010/0317302 A1 | 12/2010 | Greenwood et al. |
| 2012/0270519 A1 | 10/2012 | Ngai et al. |
| 2016/0050633 A1 | 2/2016 | Yun |
| 2017/0111210 A1* | 4/2017 | Chakrobartty ...... H04L 41/0681 |
| 2017/0273033 A1 | 9/2017 | Lee et al. |
| 2017/0289929 A1 | 10/2017 | Komulainen et al. |
| 2017/0311330 A1 | 10/2017 | Gandhi |
| 2019/0387478 A1* | 12/2019 | Sundin ................. H04B 7/0617 |

\* cited by examiner

FIG. 2

| Active Communication Band(s) | Sensitivity Setting | Output Power (full) | Output Power (reduced) |
|---|---|---|---|
| B1 | 0.9 CM | 31 dBm | 24 dBm |
| B2 | 1.5 CM | 35 dBm | 20 dBm |
| B1 and B2 | 1.5 CM | 35 dBm | 20 dBm |

OUTPUT POWER BASED ON COMMUNICATION BANDS

BACKGROUND

The ability to perform communication wirelessly is an important aspect of mobile electronic devices, such as notebook computers, tablet computers, smart phones, etc. During wireless communication, an electronic device may emit radio frequency (RF) energy that may be absorbed by tissues of a user of the electronic device. High level of RF energy absorption may cause harm to the user.

BRIEF DESCRIPTION OF THE DRAWINGS

Some examples of the present application are described with respect to the following figures.

DETAILED DESCRIPTION

Governmental regulation agencies in various countries have set limits to radio frequency (RF) energy emission from an electronic device. The limits may be defined in terms of the electronic device's specific absorption rate (SAR). The SAR is a measure of the rate at which energy is absorbed by the human body when exposed to a radio frequency electromagnetic field. For example, in the United States, the SAR limit for public exposure to RF energy from an electronic device is 1.6 watts per kilogram (1.6 W/kg). To comply with SAR regulations, an electronic device may reduce RF output power of the communication components (e.g., transceivers) when the electronic device is within a certain distance to a user of the electronic device. However, a fixed distance at which output power is to be reduced for all communication protocols may reduce the quality of wireless communications.

Examples described herein provide an approach to dynamically adjust transmit power of an electronic device to comply with SAR regulations. In an example, an electronic device may include a wireless transmitter. The electronic device may also include a controller to: determine an active communication band; determine a parameter value of a proximity sensing circuit based on the active communication band; configure the proximity sensing circuit based on the parameter value; and set an output power of the wireless transmitter based on a detection signal asserted from the proximity sensing circuit. The wireless transmitter may transmit data using the active communication band and the output power.

In another example, an electronic device may include a wireless transmitter. The electronic device may also include a controller to: determine an active communication band; determine a parameter value of a proximity sensing circuit based on the active communication band; configure the proximity sensing circuit based on the parameter value; determine a state of a detection signal from the proximity sensing circuit. When the state is a first state, the controller may set an output power of the wireless transmitter to a first value. When the state is a second state, the controller may set the output power to a second value that is less than the first value. The wireless transmitter may transmit data using the active communication band and the output power.

In another example, a method may include determining, at a communication module of an electronic device, an active communication band. The method may also include determining a parameter value of a proximity sensing circuit of the electronic device based on the active communication band. The method may further include configuring the proximity sensing circuit based on the parameter value. The parameter value may correspond to a threshold distance between the proximity sensing circuit and an external object. The method may further include, in response to detecting a distance between the external object and the proximity sensing circuit is less than the threshold distance, asserting a detection signal to the communication module. The method may further include, in response to detecting the detection signal at the communication module, reducing an output power of the communication module from a first value to a second value. Thus, examples described herein may reduce the likelihood of wireless communication quality degradation while complying with SAR regulations.

Figure 1:
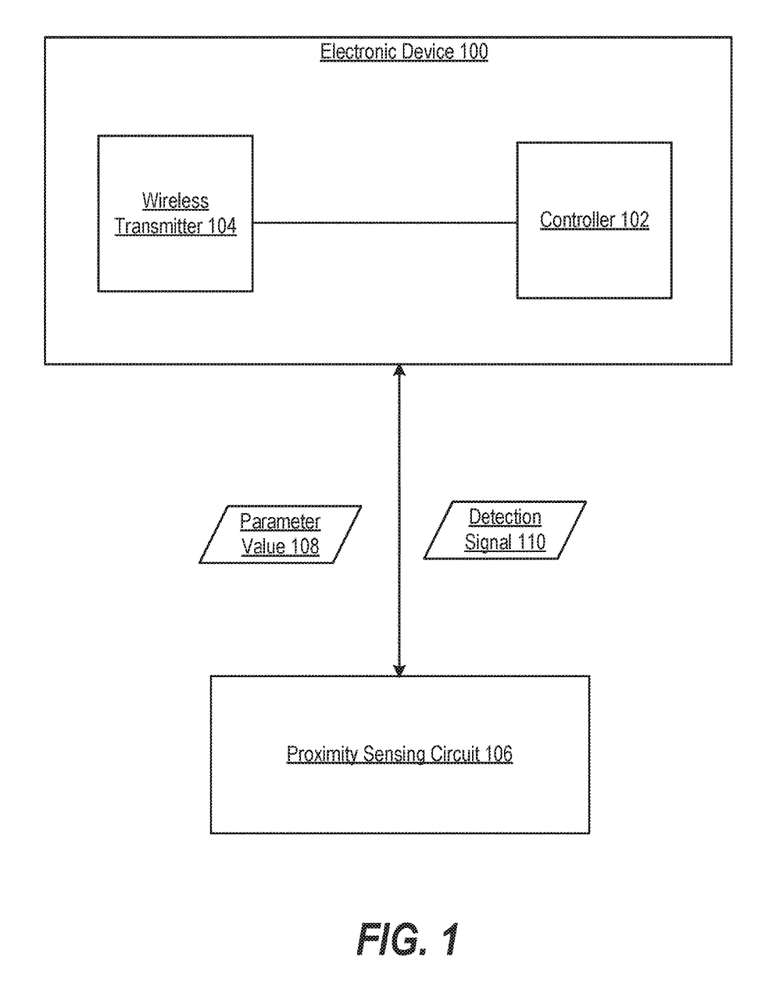
FIG. 1 illustrates an electronic device to set an output power of a wireless transmitter based on an active communication band, according to an example.

FIG. 1 illustrates an electronic device 100 to set an output power of a wireless transmitter based on an active communication band, according to an example. Electronic device 100 may include a controller 102 and a wireless transmitter 104. Electronic device 100 may be connected to a proximity sensing circuit 106 to exchange data. For example, electronic device 100 may be connected to proximity sensing circuit 106 via a circuit trace or a cable.

Electronic device 100 may be a circuit or device to process signals and transmits the processed signal using radio waves via controller 102 and wireless transmitter 104. Electronic device 100 may be implemented as a wireless communication module, such as a Wi-Fi module, a LTE module, a wireless wide area network (WWAN) module, Wi-FI/LTE/WWAN combination module, etc. Electronic device 100 may transmit signals using a plurality of communication protocols, such as Institute of Electrical and Electronics Engineers (IEEE) 802.11a, IEEE 802.11b, IEEE 802.11g, IEEE 802.11n, other members in the IEEE 802.11 family, Long-Term Evolution (LTE), Global System for Mobile (GSM), Code-Division Multiple Access (CDMA), etc.

Controller 102 may be a semiconductor-based microprocessor, and/or other hardware devices (e.g., a Field-Programmable Gate Array (FPGA)) suitable for retrieval and execution of instructions stored in a computer-readable storage medium. Controller 102 may control operations of electronic device 100 including wireless transmitter 104. Wireless transmitter 104 may be circuitry that convert information and/or signal to be communicated as a radio frequency alternating current via modulation (e.g., complementary coded keying, quadrature phase shift keying, orthogonal frequency division multiplex modulation scheme, etc.). When an antenna is excited by the radio frequency alternating current, the antenna may radiate the information and/or signal in the radio frequency alternating current as radio waves.

Proximity sensing circuit 106 may be a circuit or device to detect the presence of a nearby external object with any physical contact and provide information about the presence of the object to another device, such as controller 102. Proximity sensing circuit 106 may detect external objects using different technologies. For example, proximity sensing circuit 106 may detect the objects using an electromagnetic field, changes in capacitance, changes in optical properties, etc. In some examples, proximity sensing circuit 106 may be implemented as a capacitive proximity sensing module.

During operation, controller 102 may determine an active communication band. As used herein, an active communication band is a set of radio frequencies in use for wireless communication. For example, for LTE band 1, the frequency band may include 2110 megahertz (MHz), 2140 MHz, and 2170 MHz for downlink and 1920 MHz, 1950 MHz, and 1980 MHz for uplink. In response to determining the active communication band, controller 102 may determine a parameter value 108 of proximity sensing circuit 106 based on the active communication band.

Parameter value 108 may correspond to a value of a sensitivity setting of proximity sensing circuit 106. The sensitivity setting may control a threshold distance that proximity sensing circuit 106 is able to detect or sense an external object. That is, proximity sensing circuit 106 may detect or sense the object when the distance between the object and proximity sensing circuit 106 is equal to or less than the threshold distance. When the distance is greater than the threshold distance, proximity sensing circuit 106 may not be able to detect or sense the object. In some examples, controller 102 may determine that a plurality of communication bands is active, such as a first active communication band and a second active communication band, controller 102 may determine parameter value 108 based on the first active communication band and the second active communication band. Determining a parameter value based on an active communication band or a plurality of active communication bands is described in more detail in FIG. 3.

Controller 102 may configure proximity sensing circuit 106 based on parameter value 108. In some examples, controller 102 may configure proximity sensing circuit 106 by transmitting parameter value 108 to proximity sensing circuit 106 so that proximity sensing circuit 106 may update and/or apply parameter value 108 within proximity sensing circuit 106. In some examples, controller 102 may configure proximity sensing circuit 106 by directly updating or applying parameter value 108 within proximity sensing circuit 106. In some examples, controller 102 may configure proximity sensing circuit 106 by transmitting parameter value 108 to another device (e.g., a second controller) that may update and/or apply parameter value 108 within proximity sensing circuit 106. When proximity sensing circuit 106 detects an object, proximity sensing circuit 106 may assert a detection signal 110 (e.g., a voltage) to controller 102.

Controller 102 may set an output power of wireless transmitter 104 based on a state of detection signal 110. As described in more detail in FIGS. 2-4, when detection signal 110 is in a first state, such as in an inactive state, controller 102 may set an output power of wireless transmitter 104 to a first value. When detection signal 110 is in a second state, such as in an active state, controller 102 may set the output power to a second value that is less than the first value. Wireless transmitter may transmit data using the active communication band and the output power.

Figure 2:
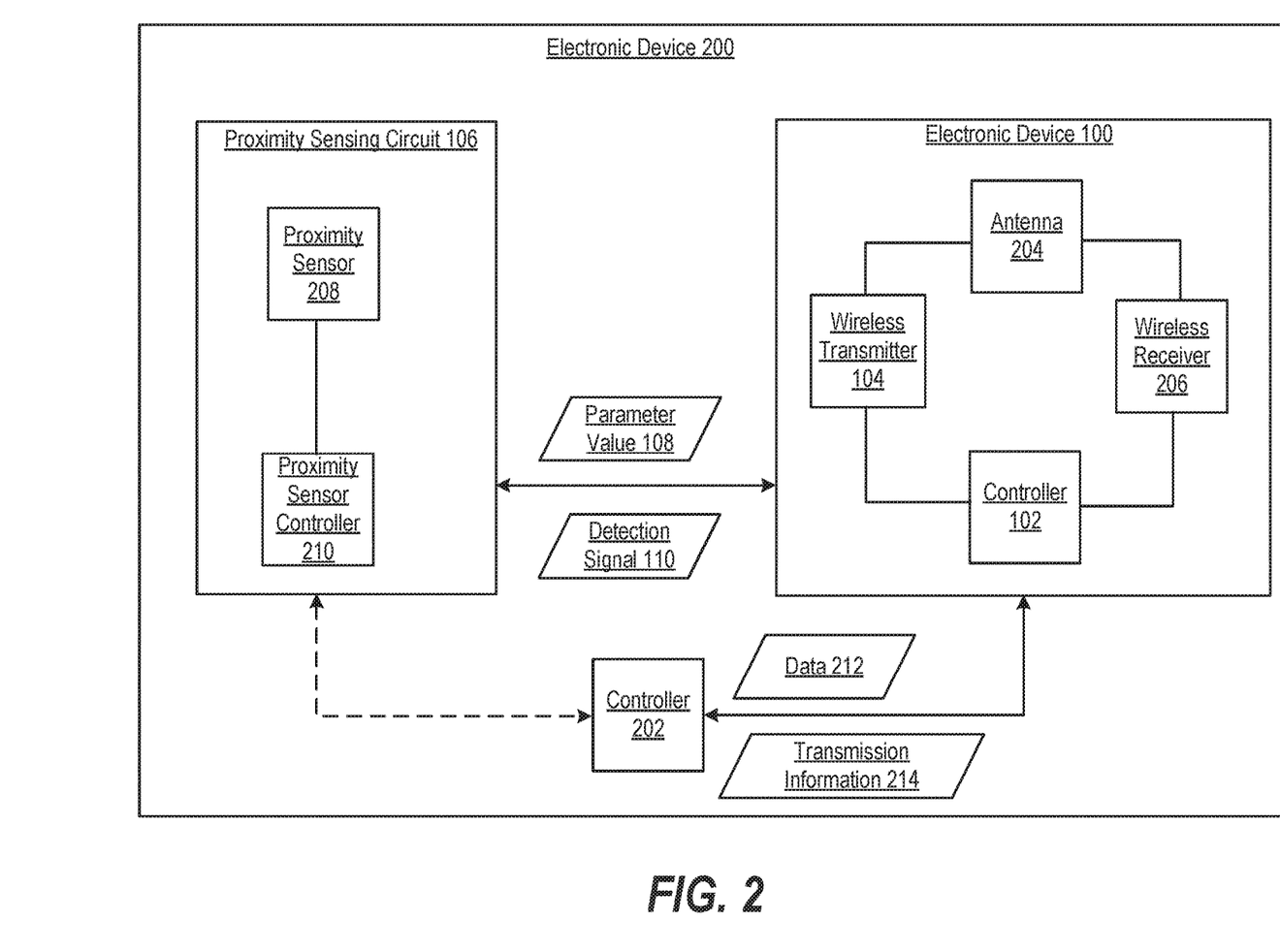
FIG. 2 illustrates an electronic device to set an output power of a wireless transmitter based on an active communication band, according to another example.

Referring to FIG. 2, FIG. 2 illustrates an electronic device 200 to set an output power of wireless transmitter 104 based on an active communication band, according to another example. Electronic device 200 may include electronic device 100, proximity sensing circuit 106, and a controller 202.

Electronic device 200 may be, for example, a web-based server, a local area network server, a cloud-based server, a notebook computer, a desktop computer, an all-in-one (AiO) system, a tablet computing device, a mobile phone, an electronic book reader, or any other electronic device able to communicate with another device wirelessly. Controller 202 may be a central processing unit (CPU), a semiconductor-based microprocessor, and/or other hardware devices suitable for retrieval and execution of instructions stored in a computer-readable storage medium (not shown in FIG. 2). Controller 202 may control operations of electronic device 200.

In some examples, electronic device 100 may include controller 102, wireless transmitter 104, an antenna 204, and a wireless receiver 206. Antenna 204 may be a hardware device to radiate and/or receive radio waves. Antenna 204 may be connected to wireless transmitter 104 and wireless receiver 206 for data transmission and reception. Antenna 204 may be implemented using metallic material that may act as an electrical conductor. Antenna 204 may be implemented as a dipole antenna, a monopole antenna, an antenna array, a patch antenna, a loop antenna, etc. Antenna 204 may be implemented using any number of antennas. Wireless receiver 206 may be circuitry that receive radio waves via antenna 204 and covert information or signal carried in the radio waves to a form useable by controller 102 and/or controller 202. In some examples, wireless receiver 206 and wireless transmitter 104 may be integrated as a single device, such as a transceiver. Controller 102 may be connected to both wireless transmitter 104 and wireless receiver 206.

In some examples, proximity sensing circuit 106 may include a proximity sensor 208 and a proximity sensor controller 210. Proximity sensor 208 may be a circuit or device to detect the presence of a nearby object with any physical contact. Proximity sensor controller 210 may be connected to proximity sensor 208 and may control operations of proximity sensor 208. For example, proximity sensor controller 210 may configure the sensitivity setting of proximity sensor 208. Proximity sensor controller 210 may be similar to controller 102.

During operation, controller 202 may provide data 212 to electronic device 100 to be transmitted wirelessly to another device. Controller 202 may also provide transmission information 214 to electronic device 100 to instruct electronic device 100 how data 212 is to be transmitted. Transmission information 214 may be any data that indicates what communication protocol(s) is to be used for transmission. In response to receiving data 212 and transmission information 214, controller 102 may determine an active communication band associated with data 212. For example, controller 102 may use a lookup table to identify a communication band for the communication protocol to be used with data 212.

In response to determining the active communication band, controller 102 may determine parameter value 108 based on the active communication band. In some examples, controller 102 may transmit parameter value 108 to proximity sensor controller 210 directly. In response to receiving parameter value 108, proximity sensor controller 210 may configure the sensitivity setting of proximity sensor 208 with parameter value 108.

When proximity sensor 208 is not able to detect an object within the threshold distance, proximity sensor controller 210 may not be able to assert detection signal 110 to controller 102. Thus, detection signal 110 may be in an inactive state. In some examples, detection signal 110 may have a logic low value when in the inactive state. In some examples, detection signal 110 may have a first voltage value when in the inactive state. In response to detecting detection signal 110 in the inactive state, controller 102 may set output power of wireless transmitter 104 to a first value.

When proximity sensor 208 detects an object (e.g., a user) is within the threshold distance as controlled by the value of the sensitivity setting, proximity sensor 208 may generate a response (e.g., a change in capacitance). Proximity sensor controller 210 may measure and/or detect the response. Proximity sensor controller 210 may assert detection signal 110 to controller 102 to indicate that an object has been detected to be within the threshold distance. Thus, proximity sensor controller 210 may change the state of detection signal 110 from the inactive state to an active state. In some examples, proximity sensor controller 210 may change the logic value of detection signal 110 from low to high. In some examples, proximity sensor controller 210 may change the voltage value of detection signal 110 from the first voltage value to a second voltage value that is higher than the first voltage value.

In response to detecting detection signal 110 changing state from the inactivate state to the active state, controller 102 may reduce the output power of wireless transmitter 104 by changing the value of the output power of wireless transmitter 104 from the first value to a second value that is less than the first value. Wireless transmitter 104 may transmit data 212 based on the output power being at the second value. Thus, based on the state detection signal 110, controller 102 may dynamically configure the value of the output power of wireless transmitter 104.

In some examples, communications between electronic device 100 and proximity sensing circuit 106 may be performed by controller 202. For example, controller 202 may determine the active communication band. Controller 202 may determine parameter value 108. Controller 202 may update and/or apply parameter value 108 to proximity sensor 208 via proximity sensor controller 210. Controller 202 may also detect the state of detection signal 110 and instruct controller 102 to adjust the value of the output power of wireless transmitter 104 based on the state of detection signal 110.

When the output power of wireless transmitter 104 is set, wireless transmitter 104 may transmit data 212 via antenna 204. When data is transmitted to electronic device 200, antenna 204 may receive the data and wireless receiver 206 may covert the data to a form useable by controller 102 and/or controller 202.

Figure 3:
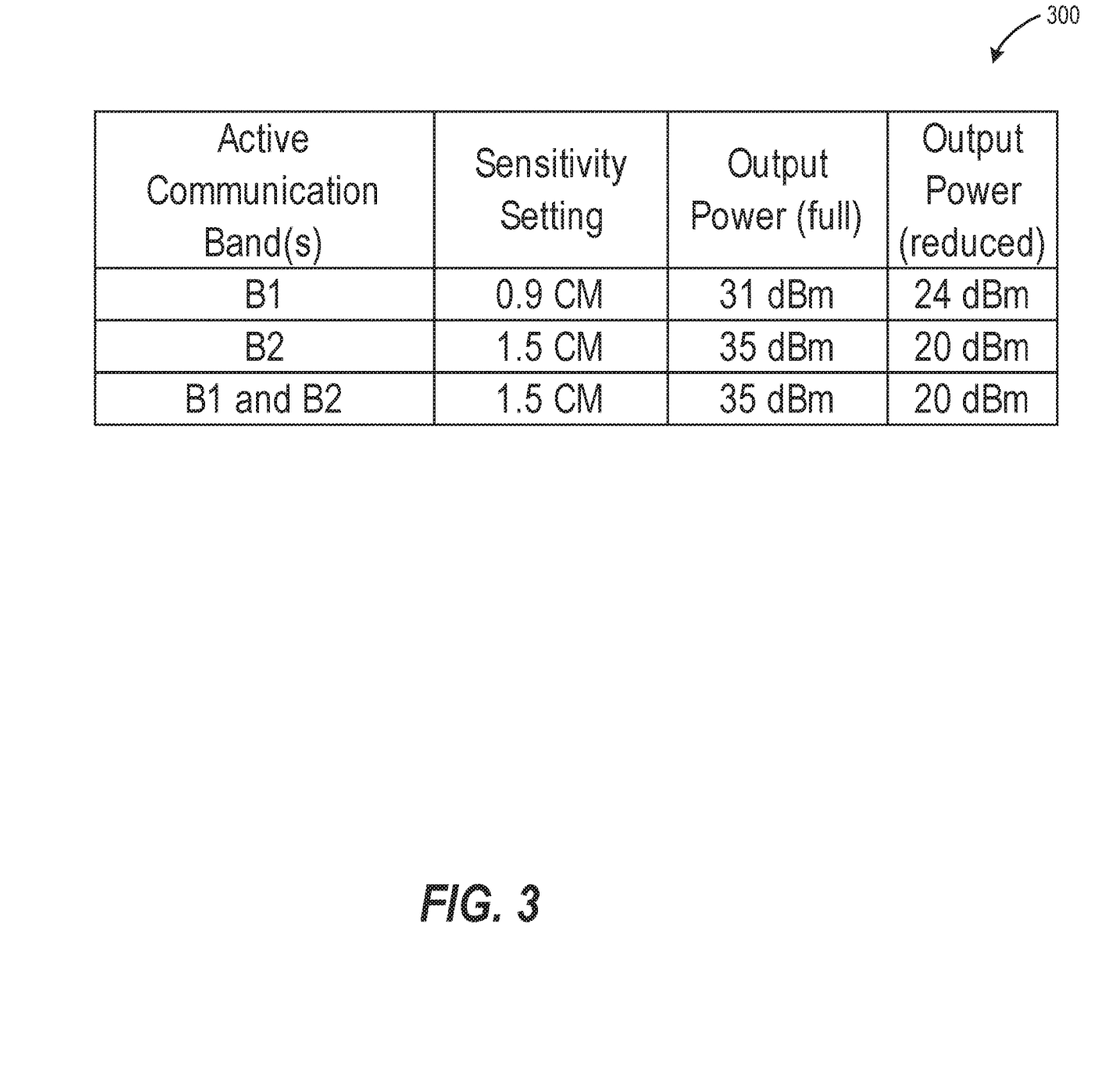
FIG. 3 illustrates a lookup table to determine an output power of a wireless transmitter based on an active communication band, according to an example.

FIG. 3 illustrates a lookup table 300 to determine an output power of a wireless transmitter based on an active communication band, according to an example. FIG. 3 may be described with reference to FIGS. 1-2. A first active communication band, B1, may be mapped to a first sensitive setting of 0.9 centimeter (CM). When communication band B1 is active, the sensitivity setting of proximity sensor 208 may be set to 0.9 CM. Thus, the threshold distance of proximity sensor 208 is 0.9 CM. When an object is within 0.9 CM of proximity sensor 208, proximity sensor controller 210 may detect a response from proximity sensor 208 and change the state of detection signal 110 from the inactivate state to the active state.

Communication band B1 may also be mapped to a first output power value of 31 decibels per milliwatt (dBm) and a second output power value of 24 dBM. When wireless transmitter 104 is transmitting data with the output power set to the first value, the wireless communication quality may be optimized. When wireless transmitter 104 is transmitting data with the output power set to the second value, electronic device 100 may be compliant with SAR regulations.

When communication band B2 is active, communication band B2 may be mapped to a sensitivity setting of 1.5 CM, a first output power value of 35 dBm, and a second output power value of 20 dBm.

In some examples, when a plurality of communication bands is active, such as when a plurality of communication protocols (e.g., IEEE 802.11n and LTE) are used to transmit data simultaneously or when carrier aggregation (CA) is used, the set of active communication bands is also mapped to a unique sensitivity setting, a first output power value, and a second output power value. For example, when communication bands B1 and B2 are both active, the set of communication bands B1 and B2 may be mapped to a sensitivity setting of 1.5 CM.

In some examples, the sensitivity setting may be determined dynamically by using the greater of the respective sensitivity settings of the communication bands. Thus, for the set of communication bands B1 and B2, the sensitivity setting may be determined by comparing the sensitivity setting of communication band B1 (0.9 CM) to the sensitivity setting of communication band B2 (1.5 CM). Since the sensitivity setting for communication band B2 is greater, the sensitivity setting for the set of communication bands B1 and B2 may be set to 1.5 CM. The set of communication bands B1 and B2 may also be mapped to a first output power value of 35 dBm and a second output power of 20 dBm.

Figure 4:
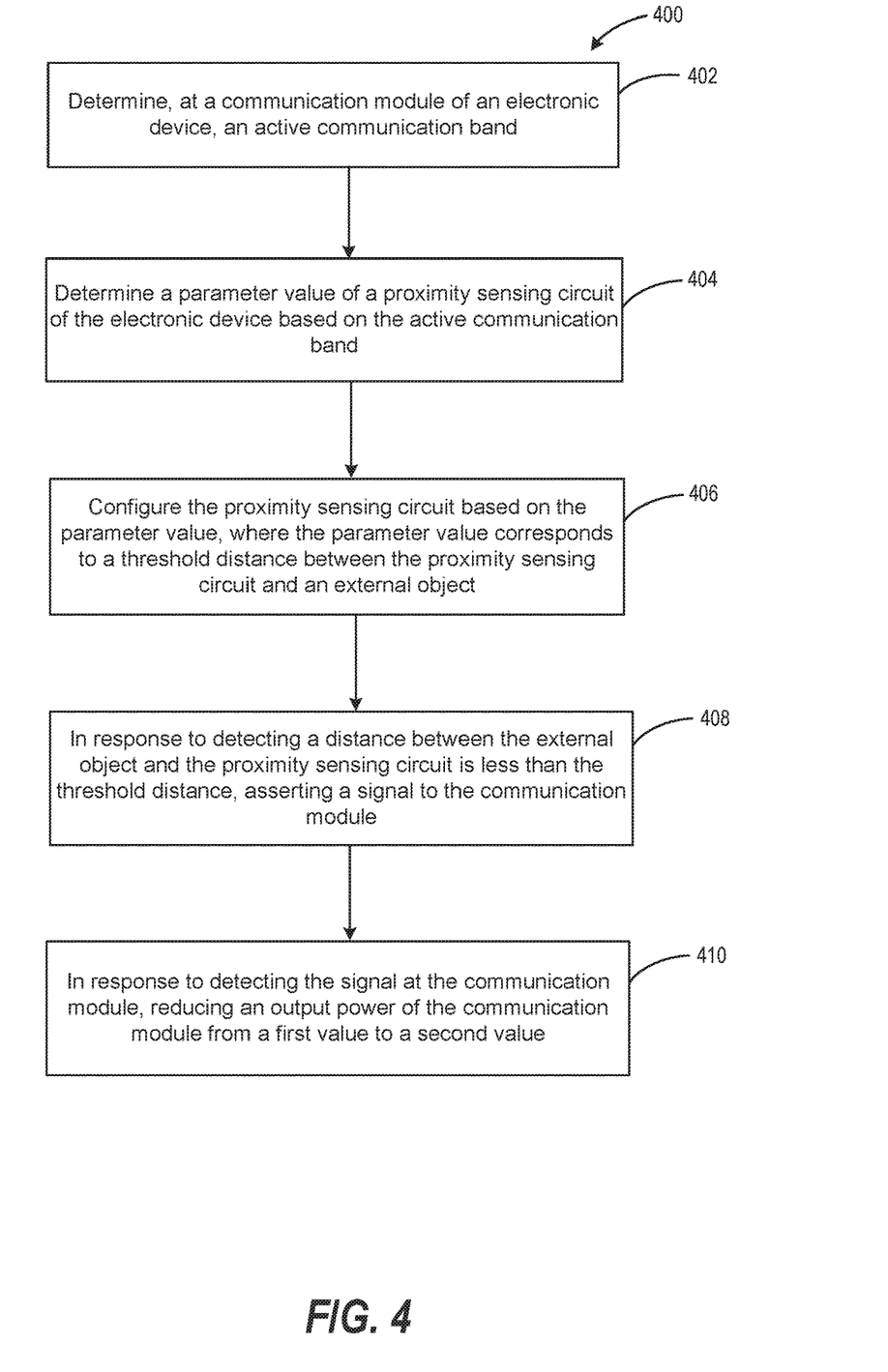
FIG. 4 illustrates a method of operation at an electronic device to set an output power of a wireless transmitter based on an active communication band, according to an example.

FIG. 4 illustrates a method 400 of operation at an electronic device to set an output power of a wireless transmitter based on an active communication band, according to an example. Method 400 may be described with reference to FIGS. 1-2. Method 400 may include determining, at a communication module of an electronic device, an active communication band, at 402. For example, referring to FIG. 2, in response to receiving data 212 and transmission information 214, controller 102 may determine an active communication band associated with data 212.

Method 400 may also include determining a parameter value of a proximity sensing circuit of the electronic device based on the active communication band, at 404. For example, referring to FIG. 2, in response to determining the active communication band, controller 102 may determine parameter value 108 based on the active communication band. Method 400 may further include configuring the proximity sensing circuit based on the parameter value, where the parameter value corresponds to a threshold distance between the proximity sensing circuit and an external object, at 406. For example, referring to FIG. 2, controller 102 may configure proximity sensing circuit 106 based on parameter value 108.

Method 400 may further include, in response to detecting a distance between the external object and the proximity sensing circuit is less than the threshold distance, asserting a signal to the communication module, at 408. For example, referring to FIG. 2, when proximity sensor 208 detects an object (e.g., a user) is within the threshold distance as controlled by the value of the sensitivity setting, proximity sensor 208 may generate a response (e.g., a change in capacitance). Proximity sensor controller 210 may measure and/or detect the response. Proximity sensor controller 210 may assert detection signal 110 to controller 102 to indicate that an object has been detected to be within the threshold distance. Method 400 may further include, in response to detecting the signal at the communication module, reducing an output power of the communication module from a first value to a second value, at 410. For example, referring to FIG. 2, in response to detecting detection signal 110 changing state from the inactivate state to the active state, controller 102 may reduce the output power of wireless transmitter 104.

Figure 5:
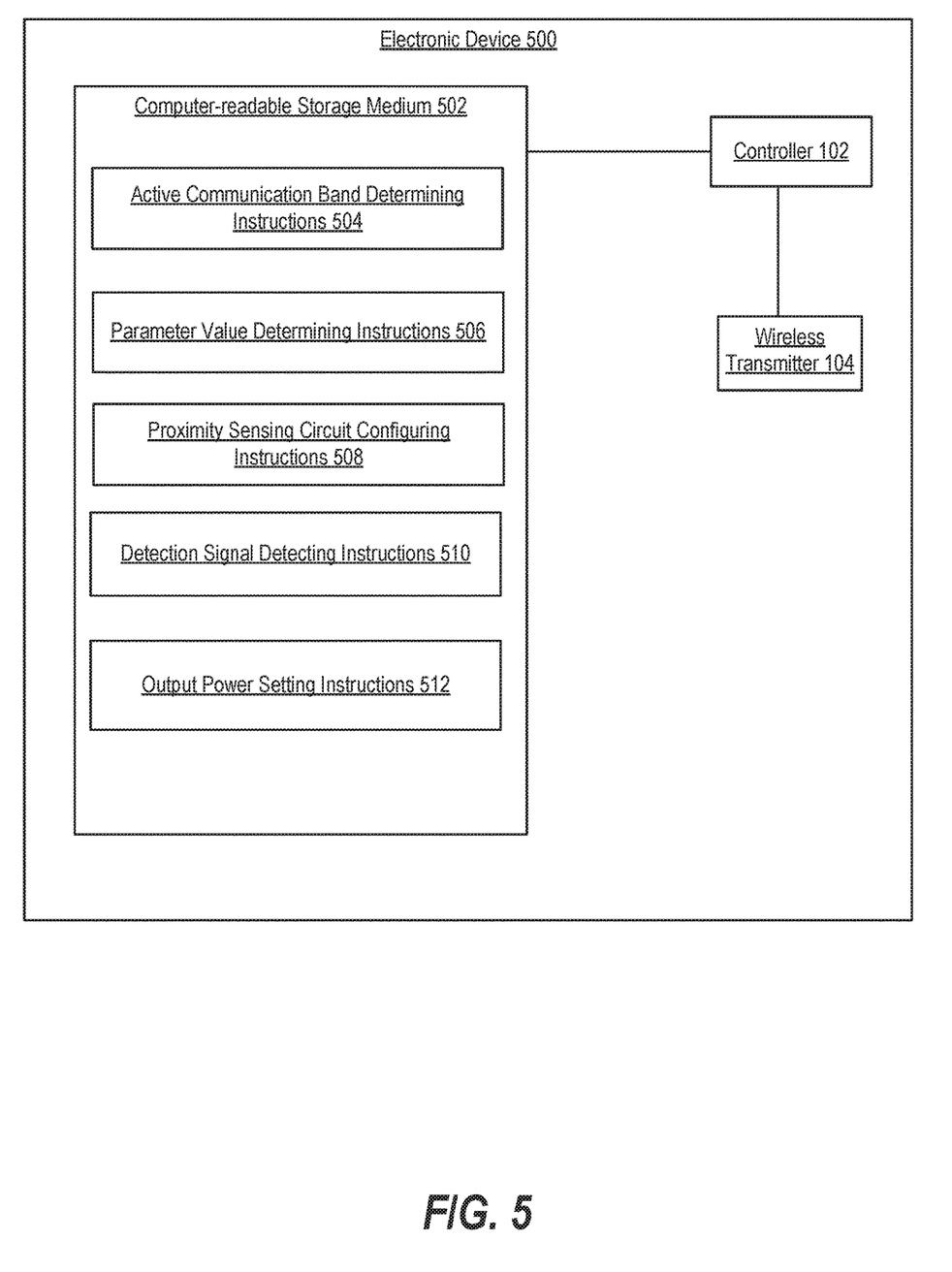
FIG. 5 illustrates an electronic device to set an output power of a wireless transmitter based on an active communication band, according to another example.

FIG. 5 illustrates an electronic device 500 to set an output power of a wireless transmitter based on an active communication band, according to another example. Electronic device 500 may implement electronic device 100 of FIGS. 1-2. Electronic device 500 may include controller 102, wireless transmitter 104, and a computer-readable storage medium 502. Computer-readable storage medium 502 may be any electronic, magnetic, optical, or other physical storage device that contains or stores executable instructions. Thus, computer-readable storage medium 502 may be, for example, Random Access Memory (RAM), an Electrically Erasable Programmable Read-Only Memory (EEPROM), a storage device, an optical disc, etc. In some examples, computer-readable storage medium 502 may be a non-transitory storage medium, where the term "non-transitory" does not encompass transitory propagating signals. As described in detail below, computer-readable storage medium 502 may be encoded with a series of processor executable instructions 504, 506, 508, 510, and 512. FIG. 5 may be described with reference to FIG. 2.

Active communication band determining instructions 504 may determine an active communication band. For example, referring to FIG. 2, in response to receiving data 212 and transmission information 214, controller 102 may determine an active communication band associated with data 212.

Parameter value determining instructions 506 may determine a parameter value based on the active communication band. For example, referring to FIG. 2, in response to determining the active communication band, controller 102 may determine parameter value 108 based on the active communication band. Proximity sensing circuit configuring instructions 508 may configure a proximity sensing circuit based on the parameter value. For example, referring to FIG. 2, controller 102 may configure proximity sensing circuit 106 based on parameter value 108.

Detection signal detecting instructions 510 may detect that a detection signal is active (e.g., the detection signal is asserted). For example, referring to FIG. 2, In response to detecting detection signal 110 changing state from the inactivate state to the active state, controller 102 may reduce the output power of wireless transmitter 104. Output power setting instructions 512 may set the output power of a wireless transmitter. For example, referring to FIG. 2, controller 102 may change the value of the output power of wireless transmitter 104 from the first value to a second value that is less than the first value.

Figure 6:
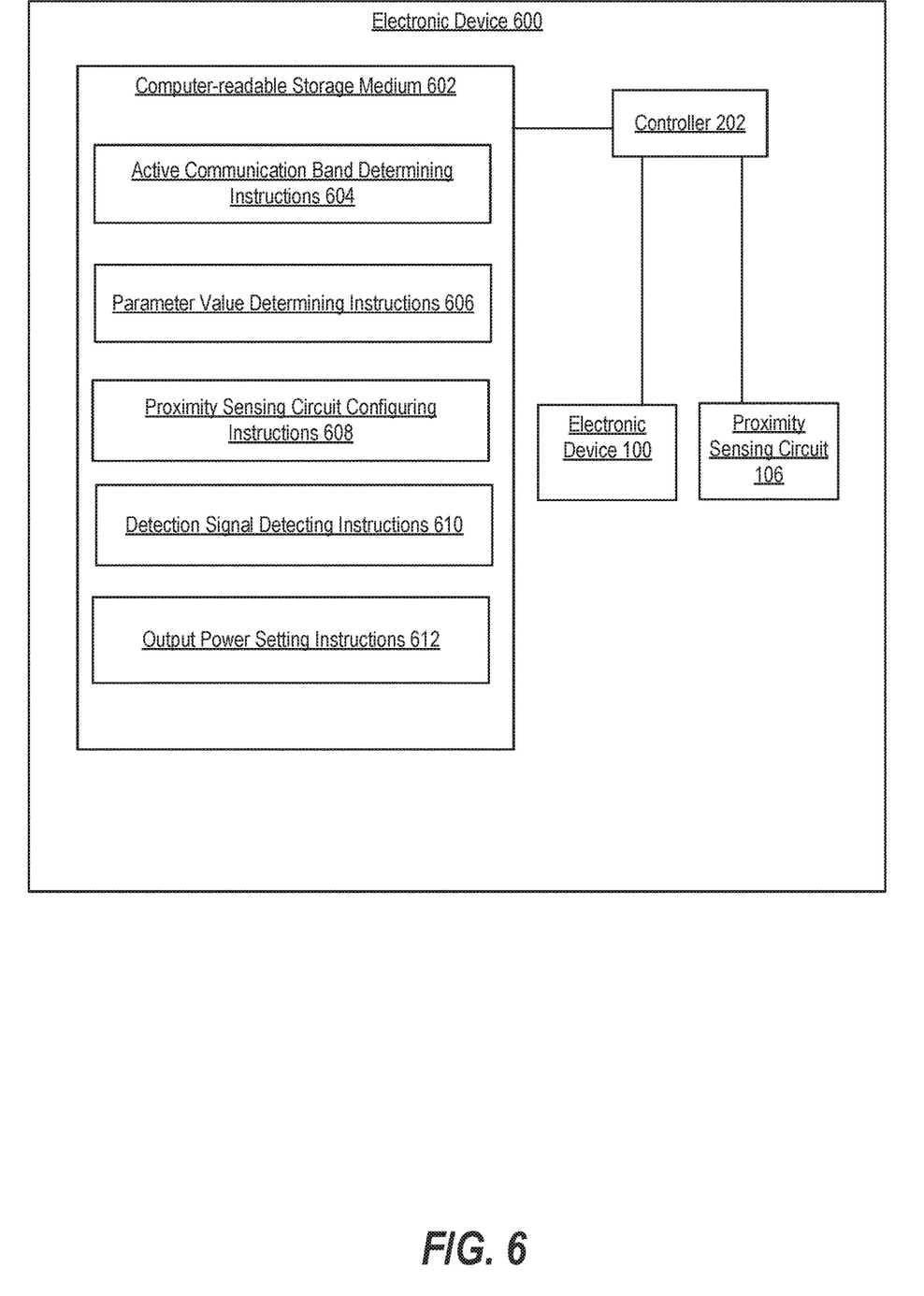
FIG. 6 illustrates an electronic device to set an output power of a wireless transmitter based on an active communication band, according to another example.

FIG. 6 illustrates an electronic device 600 to set an output power of a wireless transmitter based on an active communication band, according to another example. Electronic device 600 may implement electronic device 200 of FIG. 2. Electronic device 600 may include controller 202, electronic device 100, proximity sensing circuit 06, and a computer-readable storage medium 602 that is similar to computer-readable storage medium 502.

Active communication band determining instructions 604 may determine an active communication band. For example, referring to FIG. 2, controller 202 may determine the active communication band. Parameter value determining instructions 606 may determine a parameter value based on the active communication band. For example, referring to FIG. 2, controller 202 may determine parameter value 108.

Proximity sensing circuit configuring instructions 608 may configure a proximity sensing circuit. For example, referring to FIG. 2, controller 202 may update and/or apply parameter value 108 to proximity sensor 208 via proximity sensor controller 210. Detection signal detecting instructions 610 may detect a detection signal. For example, referring to FIG. 2, controller 202 may detect the state of detection signal 110. Output power setting instructions 612 may set the output power of a wireless transmitter. For example, referring to FIG. 2, controller 202 may instruct controller 102 to adjust the value of the output power of wireless transmitter 104 based on the state of detection signal 110.

The use of "comprising", "including" or "having" are synonymous and variations thereof herein are meant to be inclusive or open-ended and do not exclude additional unrecited elements or method steps.

What is claimed is:

1. An electronic device comprising:
a wireless transmitter; and
a controller to:
determine a first active communication band and a second active communication band;
determine a parameter value of a proximity sensing circuit based on the first active communication band and the second active communication band;
configure the proximity sensing circuit based on the parameter value; and
set an output power of the wireless transmitter based on a detection signal asserted from the proximity sensing circuit, wherein the wireless transmitter is to transmit data using the first active communication band or the second active communication band and the output power.

2. The electronic device of claim 1, wherein the first active communication band is mapped to a first value, wherein the second active communication band is mapped to a second value, and wherein the parameter value is the greater of the first value and the second value.

3. The electronic device of claim 1, further comprising an antenna coupled to the wireless transmitter, wherein the wireless transmitter is to transmit the data via the antenna.

4. The electronic device of claim 1, wherein the controller is to configure the proximity sensing circuit by transmitting the parameter value to the proximity sensing circuit.

5. The electronic device of claim 1, wherein the controller is to configure the proximity sensing circuit by transmitting the parameter value to a second controller.

6. The electronic device of claim 1, wherein the parameter value corresponds to a value of a sensitivity setting of the proximity sensing circuit.

7. The electronic device of claim 6, wherein the first active communication band is mapped to a first value, wherein the second active communication band is mapped to a second value, and wherein the sensitivity setting of the proximity sensing circuit is the greater of the first value and the second value.

8. An electronic device comprising:
a wireless transmitter; and
a controller to:

determine a first active communication band and a second active communication band;

determine a parameter value of a proximity sensing circuit based on the first active communication band and the second active communication band;

configure the proximity sensing circuit based on the parameter value;

determine a state of a detection signal from the proximity sensing circuit;

when the state is a first state, set an output power of the wireless transmitter to a first value; and when the state is a second state, set the output power to a second value that is less than the first value, wherein the wireless transmitter is to transmit data using the first active communication band or the second active communication band and the output power.

9. The electronic device of claim 8, wherein the first state corresponds to the detection signal being inactive, and wherein the second state corresponds to the detection signal being active.

10. The electronic device of claim 8, wherein the parameter value corresponds to a value of a sensitivity setting of the proximity sensing circuit.

11. The electronic device of claim 8, wherein the controller is to change the output power back to the first value when the state changes from the second state to the first state.

12. The electronic device of claim 8, further comprising: a wireless receiver; and an antenna connected to the wireless transmitter and the wireless receiver.

13. A method comprising:

determining, at a communication module of an electronic device, a first active communication band and a second active communication band;

determining a parameter value of a proximity sensing circuit of the electronic device based on the first active communication band and the second active communication band;

configuring the proximity sensing circuit based on the parameter value, wherein the parameter value corresponds to a threshold distance between the proximity sensing circuit and an external object;

in response to detecting a distance between the external object and the proximity sensing circuit is less than the threshold distance, asserting a detection signal to the communication module; and in response to detecting the detection signal at the communication module, reducing an output power of the communication module from a first value to a second value.

14. The method of claim 13, wherein determining the parameter value includes determining the parameter value via a lookup table.

15. The method of claim 13, further comprising: in response to detecting the detection signal being inactive, setting the output power to the first value.

* * * * *